United States Patent
McNamara et al.

(10) Patent No.: US 9,305,096 B2
(45) Date of Patent: Apr. 5, 2016

(54) UNIFORM RESOURCE IDENTIFIER TEMPLATE MANIPULATION

(75) Inventors: Brian Matthew McNamara, Bellevuew, WA (US); Tiruneveli R. Vishwanath, Redmond, WA (US); Stephen J. Maine, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1284 days.

(21) Appl. No.: 12/030,093

(22) Filed: Feb. 12, 2008

(65) Prior Publication Data

US 2008/0270428 A1 Oct. 30, 2008

Related U.S. Application Data

(60) Provisional application No. 60/915,082, filed on Apr. 30, 2007.

(51) Int. Cl.
*G06F 17/30* (2006.01)

(52) U.S. Cl.
CPC .... *G06F 17/30867* (2013.01); *G06F 17/30286* (2013.01); *G06F 17/30595* (2013.01); *G06F 17/30876* (2013.01)

(58) Field of Classification Search
CPC ............... G06F 17/30867; G06F 17/30286; G06F 17/30595
USPC ........... 707/709, 807, 790, 802; 709/230, 214
See application file for complete search history.

(56) References Cited

U.S. PATENT DOCUMENTS

| | | | |
|---|---|---|---|
| 6,990,585 B2* | 1/2006 | Maruyama et al. | 713/176 |
| 7,194,692 B2 | 3/2007 | Marcos et al. | |
| 7,240,100 B1* | 7/2007 | Wein et al. | 709/214 |
| 2002/0026447 A1 | 2/2002 | Matsutsuka et al. | |
| 2004/0249824 A1 | 12/2004 | Brockway et al. | |
| 2005/0060647 A1 | 3/2005 | Doan et al. | |
| 2005/0114485 A1 | 5/2005 | McCollum | |
| 2005/0177635 A1 | 8/2005 | Schmidt et al. | |
| 2006/0041579 A1 | 2/2006 | Miyashita et al. | |
| 2006/0288328 A1 | 12/2006 | Cross, Jr. et al. | |
| 2008/0104277 A1* | 5/2008 | Tian | 709/248 |
| 2008/0155110 A1* | 6/2008 | Morris | 709/230 |

OTHER PUBLICATIONS

"Recursive URL Substitution Syntax", last modified Aug. 3, 2007, Wiki.secondlife.com, pp. 1-3.*
Experiences in Developing a Typical Web/Database Application (2 pages) http://delivery.acm.org/10.1145/960000/958427/p38-rosen.pdf?key1=958427&key2=7611078711&coll=GUIDE&dl= GUIDE&CFID=21988851&CFTOKEN=27968530.
Combining Data Integration with Natural Language Technology for the Semantic Web (25 pages) http://www.dcs.bbk.ac.uk/~ap/pubs/hltswwsFull.pdf.

* cited by examiner

*Primary Examiner* — Shahid Alam
(74) *Attorney, Agent, or Firm* — Ben Tabor; Raghu Chinagudabha; Micky Minhas

(57) ABSTRACT

Data may be bound to a Uniform Resource Identifier (URI) template using a bind operation. Conversely, a URI may be matched against a URI template to result in data extracted from the URI. A URI may be matched against multiple URI templates using, for example, a template table to thereby generate an estimated best-match URI template for the URI, and potentially also return matched data extracted from the URI using the best-match URI template.

8 Claims, 4 Drawing Sheets

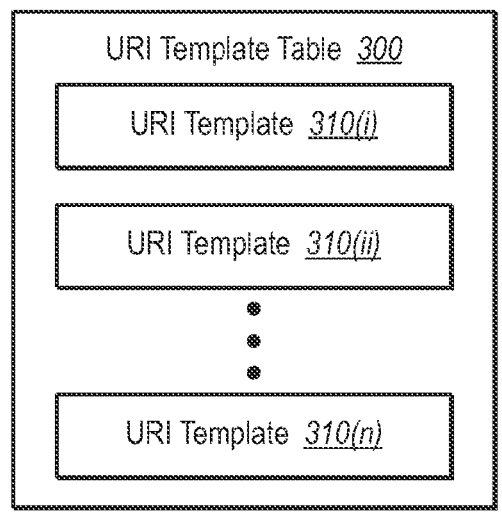
FIG. 3
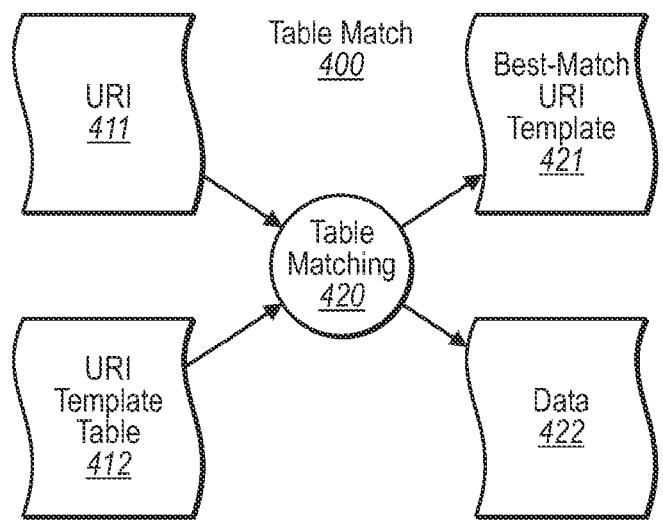
FIG. 4
500
Templates + Data
| | |
|---|---|
| L1/{var1}/l1/{var2} | Data 1 |
| L1/{var2}/l2 | Data 2 |
| L1/L4 | Data 3 |
| {var1}/l5 | Data 4 |
| {var2}/l6/* | Data 5 |
| * | Data 6 |
501A → row 1, 501B → row 1
502A → row 2, 502B → row 2
503A → row 3, 503B → row 3
504A → row 4, 504B → row 4
505A → row 5, 505B → row 5
506A → row 6, 506B → row 6
FIG. 5

UNIFORM RESOURCE IDENTIFIER TEMPLATE MANIPULATION

CROSS-REFERENCE TO RELATED APPLICATIONS

This patent application claims priority to U.S. provisional application Ser. No. 60/915,082 filed Apr. 30, 2007, which provisional application is incorporated herein by reference in its entirety.

BACKGROUND

Network-based information systems use Uniform Resource Identifiers (URI's) to identify and organize resources within their particular information spaces. The set of possible URI's in an information space may be quite large, particular when dealing with the World Wide Web. Due to the large number of possible URI's, it is sometimes convenient to use a compact notation for describing sets of structurally similar URI's.

URI Templates provide this compact notation by introducing the concept of variables into the URI. In URI Template syntax used herein, a variable is written in {curlyBraces} and represents a hole or "point of abstraction" in the URI into which concrete values can substituted. Accordingly, URI templates provide a flexible and convenient mechanism for representing multiple URIs using a single expression.

BRIEF SUMMARY

In accordance with a first embodiment described herein, data may be bound to a Uniform Resource Identifier (URI) template using a bind operation. Conversely, in accordance with a second embodiment described herein, a URI may be matched against a URI template to result in data extracted from the URI. In a third embodiment described herein, a URI may be matched against multiple URI templates to thereby generate an estimated best-match URI template for the URI, and potentially also return matched data extracted from the URI using the best-match URI template. Thus, a variety of tools for using URI templates are described.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a URI template table in accordance with embodiments described herein;

FIG. 4 illustrates an operation for matching a URI against a template table;

FIG. 5 illustrates a specific example of a template table that includes six URI templates;

DETAILED DESCRIPTION

The described embodiments herein relate to Uniform Resource Identifier (URI) templates and their use. URIs are used in a network environment to identify a resource. URI templates are a mechanism for identifying structurally similar URIs by representing the structurally similar parts as concrete values, and by representing other parts of the URI using variable notation.

The following set of URI templates describe a hypothetical information system consisting of various constituent entities including Core Objects, Feeds, Items, and Enclosures. The identity of these constituent entities is not relevant to this description since the principles of the present invention apply regardless of the particular URI structure.

In our example, however, the URI templates may be as expressed in the following Table 1:

TABLE 1

| Entity Type | Uri Path Template |
|---|---|
| Core Objects: | CoreObjects |
| Core Object: | CoreObjects/{coreObjectId} |
| Feeds: | CoreObjects/{coreObjectId }/Feeds |
| Feed: | CoreObjects/{coreObjectId }/Feeds/{feedId} |
| Items: | CoreObjects/{coreObjectId }/Feeds/{feedId}/Items |
| Item: | CoreObjects/{coreObjectId }/Feeds/{feedId}/Items/{itemId} |
| ItemVersions: | CoreObjects/{coreObjectId }/Feeds/{feedId}/Items/{itemId}/Versions |
| ItemVersion: | CoreObjects/{coreObjectId }/Feeds/{feedId}/Items/{itemId}/Versions/{version} |
| Enclosures: | CoreObjects/{coreObjectId }/Feeds/{feedId}/Enclosures |
| Enclosure: | CoreObjects/{coreObjectId }/Feeds/{feedId}/Enclosures/{enclosureId} |

This table illustrates 10 different URI path templates, each representing a particular entity type. In one embodiment described further below, the URI Templates may each be implemented in the form of an instance of an object class. This object class may be called UriTemplates in the description that follows. However, the principles of the present invention are not limited to the name, structure, or programming language or model of the URI template.

In accordance with a embodiment described herein, URI templates are used to describe a structural transformation between a set of loose data values and a fully closed URI. This transformation is referred to herein as "binding" the template to a set of parameter values.

Figure 1:
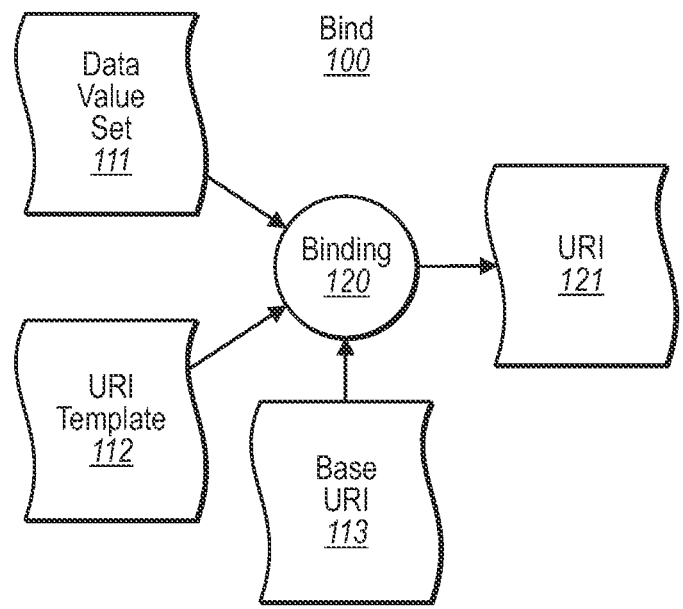
FIG. 1 illustrates a binding operation for binding data to a Uniform Resource Identifier (URI) template.

FIG. 1 conceptually illustrates a binding 100, in which a data values set 111 and a URI template 112 are provided to the binding operation 120, thereby resulting in a fully closed URI 121. In this description and in the claims, a fully closed URI is a URI in which all of its constituent parts have concrete values. Additionally, a base URI 113 may also optionally be provided to the binding operation 120.

For example, suppose that the data value set [2, 23] is to be bound using the URI template "CoreObjects/{coreObjectId}/

Feeds/{feedId}" using a base URI "http://localhost". This would result in the fully closed URI "http://localhost/CoreObjects/2/Feeds/23". Thus, for all of the variable segments, a component of the data is associated with the variable segment, and then the URI is formulated by placing the associated data in the URI where the URI template specifies the variable segment is.

Also, an efficient system for matching candidate URI's against a set of templates is described. For instance, this system may be implemented in an associative table that maps URI Templates to arbitrary user data.

In accordance with a second embodiment described herein, URI templates are used to match a URI and a URI template to thereby generate a set of name/value pairs. This transformation is referred to herein as "matching".

Figure 2:
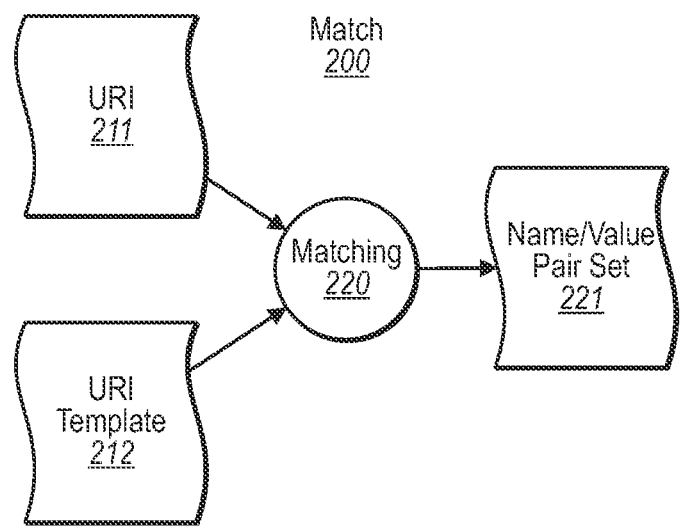
FIG. 2 illustrates a matching operation for matching a URI with a URI template to thereby extract data from the URI.

FIG. 2 conceptually illustrates a matching 200, in which a URI 211 and a URI template 212 are provided to the matching operation 220, thereby resulting in a name/value pair set 221. The name/value pair set 221 may then be used programmatically to thereby allow the information from the URI to be used to make function calls.

For instance, suppose that the input URI is "CoreObjects/12/Feeds/26/Items/15", and the input URI template is "CoreObjects/{coreObjectId}/Feeds/{feedId}/Items/{itemId}". The resulting name value pair might be represented as "coreObjectId=12, feedId=26, itemId=15". These name/value pairs together uniquely represent an Item in an organizational system as shown in Table 1.

One, some, or all of these name/value pairs may be used to place a function call or to interface programmatically. For instance, perhaps these values might be used to place a function call "GetItem(string coreObjectId, string feedId, string itemId). Accordingly, the matching operation creates a lexical environment in which the variable names in the template are bound to the values extracted from their corresponding segments and surface those up as a name/value collection.

Accordingly, the matching involves identifying a location of variable segments within the URI template. For at least some of the identified locations, associated locations of the URI are identified. The data associated with the identified associated locations of the URI may then be provided as a result of the matching operation.

If the URI template were to include literal segments, the matching operation would confirm that the literal segments of the URI match the corresponding literal segments of the URI template. Otherwise, the matching operation might throw an exception, or return a failure message.

If the URI template were to contain wildcard markers, then the matching would identify the zero or more (or one or more) segments of the URI that correspond to the wildcard segment. The location of the segments in the URI that correspond to variable and literal segments of the URI template would then be considered in light of the wildcard marker.

A URI template table is also described herein. In one embodiment, the URI template table is an object class called "UriTemplateTable". However, as previously mentioned, the URI template table is not limited to any particular name or programming model. In one example, this UriTemplateTable class schematizes a lookup table that allows typed data to associated with individual URI templates.

FIG. 3 illustrates a URI template table 300. The URI template table 300 includes constituent URI template 310(i) and potentially additional URI templates 310(ii) through (n), where "n" is any whole number.

FIG. 4 illustrates a template table operation 400 in which a URI 411 and a URI template table 412 are used as input to a template matching operation 420, to thereby output a URI template 421 that most closely matches the input URI 411 and/or output the name/value pair sets 422 that result from performing a match on the resulting URI template 421 against the input URI 411. Accordingly, URI's can be matched against the templates in the table to return the most closely-matched URI and/or the associated URI data.

In one example embodiment, path wildcard template tokens are used to describe groups of similarly structured URIs. Additional, a canonicalized representation for URI Templates is introduced that allow for logical reasoning about structurally equivalent URI templates. This notion generalizes to both URI paths and query strings.

The UriTemplate class and the UriTemplateTable class are described in further detail below with specific examples. However, one of ordinary skill in the art will understand, after having reviewed this description, that such a class is an example only. The object classes may be instantiated and executed by a computing system, and may be drafted using any source code language.

The UriTemplate class in this example has an Application Program Interface (API) that may, for example, appear as follows:

```
namespace System
{
    public class UriTemplate
    {
        public UriTemplate(string template) { }
        public override string ToString( );
        public Uri BindByName(Uri baseAddress, NameValueCollection parameters) { }
        public Uri BindByPosition( Uri baseAddress, params string[ ] uriSegments ){ }
        public UriTemplateMatchResults Match(Uri baseAddress, Uri candidate) { }
        public ReadOnlyCollection<string> VariableNames { get; }
        public bool IsEquivalent( UriTemplate template );
    }
}
```

In this example, a UriTemplate may be constructed with an unescaped string of a specific format as described further below. The ToString( ) implementation may return this unescaped string in its original form.

In accordance with the binding operation 100 of FIG. 1, fully closed URI's can be created from this template by calling UriTemplate.BindByName( ), passing in a base address for the URI and a name/value collection of parameters which will be used for template variable substitution.

Alternatively, and also in accordance with the binding operation 100 of FIG. 1, positional binding syntax for programming model simplicity may be implemented via UriTemplate.BindByPostition( ). This may, for example, have the same basic effect as BindByName( ). However, the template variables are provided via a params array of strings and are substituted into the template from left to right. The number of parameters passed to BindByPosition may, in one embodiment, be made to match the number of variables defined in the template being bound. In that embodiment, failure to provide the correct number of parameters may cause UriTemplate.BindByPosition( ) to throw an exception.

The name/value collection passed to BindByName( ) contain a key for every template variable. These keys are matched by case-insensitive name. If a named entry is missing or an extra parameter is provided, BindByName may be configured to throw an exception.

The follow snippet of unit test code illustrates the basic semantics of the System.UriTemplate class in accordance with the example (with line numbering added for clarity as with the other code examples throughout this description):

```
1) int coreObjectId = 1;
2) intfeedId = 2;
3) UriTemplate     template     =     new     UriTemplate(
   "CoreObjects/{coreObjectIld}/Feeds/{feedId}?format={format}");
4) Uri     resourceUri1     =     template.BindByPosition(     "http://localhost:81",
   coreObjectId, feedId, "rss" );
5) NameValueCollection     parameters     =     new     NameValueCollection( ){
   "coreObjectId" = coreObjectId, "feedId" = feedId, "format" = "rss"    };
6) Uri resourceUri2 = template.BindByName( "http://localhost:81", parameters);
7) string correctUri = "http://localhost:81/CoreObjects/1/Feeds/2?format=rss";
8) Debug.Assert( resource1.ToString( ) == correctUri);
9) Debug.Assert( resource2.ToString( ) == correctUri);
10) UriTemplateMatchResults matchResults = template.Match( new Uri(
    "http://localhost:81" ), new Uri( correctUri );
    //Match( ) returns null if no match is found
11) if( matchResults == null)
12) {
13)    Debug.Assert( false );
14) }
```

A UriTemplate string has the following form, presented here in pseudo-BNF:

```
1) pathExpr queryExpr
2) pathExpr : optionalSlash segment segmentWithSlash* wildcard
3) segment : literal variable
4)         wildcard : /* | <not present>
5)         literal : <any valid URI segment>
6)         variable: {variableName}
7) queryExpr  :  ?  |  ?( literalPair |
   queryVariablePair  )*  |  8)
             <String.Empty>
8) <not present>
9) literalPair : char = char
10) queryVariablePair : char = variable
```

As represented in this pseudo-BNF code, a template has two parts—a path and a query. Leading and trailing slashes are optional in the path expression, and the query expression can be omitted entirely. A path consists of a series of segments delimited by /. Each segment can have a literal value, a variable value (written in {curlyBraces}, constrained to match the contents of exactly one segment), or a wildcard (written as *). In one embodiment, the wildcard matches "the rest of the path"). In other embodiments, a wildcard might represent multiple contiguous segments regardless of whether those segments contain literal values or variables. Variables represent structural abstraction points in the URI. The variables take their name from the contents of their curly braces and they can later be replaced with a concrete value to create a closed URI. The path wildcard can optionally appear at the end of the URI, where it logically matches "the rest of the path".

The query expression can be omitted entirely. If present, it specifies a series of name/value pairs. Elements of the query expression can either be literal pairs (e.g. x=2) or a variable pair (e.g. x={var}). Unpaired values (e.g ?x) are not permitted in this example. In this embodiment, there is no semantic difference between an empty query expression and a query expression consisting of just a single ? (both mean 'any query'). The set of name/value pairs within the query expression are unordered.

All template variable names within a template string may be unique to allow unique identification. In one embodiment, template variable names are case-insensitive.

In the described example, examples of valid template strings are as follows:
" "
"/foo" (a literal match—matches/foo but not/foo/bar)

"/foo/*" (a wildcard (prefix) match—matches/foo, /foo/bar, /foo/bar/baz, etc.)
"{foo1}/bar"
"{foo}/{bar}/baz/{quux}"
"foo/{bar}"
"foo/{bar}/*"
"foo/bar?x=2"
"foo/{bar}/?x={baz}"
"?x={foo}"

In the described example, examples of invalid template strings are as follows:
"{foo}/{FOO}/x=2"—duplicate variable names.
"{foo1}/bar/?baz={foo}"—duplicate variable names.
"?x=2&x=3"—Name/value pairs within a query string must be unique in the example, even if they are literals.
"?x=2&"—Query string is malformed.
"?2&x={foo}"—Query string must be name/value pairs in the example.
"?y=2&&X=3"—Query string must be name value pairs in the example, names cannot start with "&" in the example.

Identity and Equivalence of UriTemplates

Two UriTemplate instances are identical if they are reference-equal. When dealing with sets of UriTemplates, it is useful to define a looser notion of structural equivalence between two templates. The UriTemplate.IsEquivalent( ) method is the API mechanism by which structural equivalence may be determined.

In one embodiment, two URI's are structurally equivalent if and only if their canonicalized string representations are character-by-character identical. In this embodiment, UriTemplates are canonicalized according to the following rules:

All variables are replaced with a common name (e.g. {_})
Leading and trailing slashes are removed from the path expression
Literal segments are UrlEscaped and ToLowerInvariant( )ed
Query string variable pairs are reordered alphabetically from left to right
The LHS of query string pairs are canonicalized via ToLowerInvariant( )
Query expressions consisting of a lone question mark are removed
The RHS of query string literal pairs are UrlEscaped According to these rules, the following UriTemplate strings have a/{_}/b %20b/{_}?x=1&y=2
/a/{var}/b b/{var2}?x=1&y=2
a/{x}/b%20b/{var1}?y=2&x=1
a/{y}/B%20B/{z}/?y=2&x=1

The following query string expressions are NOT structurally equivalent (the combinatorial matrix of IsEquivalent calls all return false):

?x=1
?x=1&y=2
?x={var}
?x=1&y{var}

We provide the Match( ) API on UriTemplate, which is a mechanism for asserting structural equivalence between a fully closed candidate URI and an open template. If the structures are determined to be equal, a name/value collection is created consisting of the variable names from the template paired with their respective values from the candidate URI. This collection is returned as part of the UriTemplateMatchResults returned to the caller of Match( ). If no structural match is made, Match( ) returns null. The Authority portion of the candidate URI is not considered during Match( ).

Notes on Escaping and Parsing.

Template strings are canonicalized internally in the same way that System.Uri canonicalizes the strings with which it is constructed. Templates with escaped literals are treated in the way a user would expect—for example, "{foo}/Core Objects/{bar}" will match that same set of URI's as "{foo}/Core%20Objects/{bar}".

The logic of System.Web.HttpUtility.ParseQueryString( ) is used to crack the query string into a name/value collection.

During Bind*, exactly one level of URL of applied escaping prior to extruding the parameters into the URI During Match, exactly one level of unescaping post-match is applied prior to placing the variable values in the NameValueCollection object being created.

The individual members of UriTemplateMatchResults are escaped as defined below.

UriTemplateTable

A UriTemplateTable is an associative table of UriTemplates in which each template bound to an object of the user's choosing. The public API surface of the System.ServiceModel.Web.UriTemplateTable class is as follows:

```
public class UriTemplateTable
{
  public UriTemplateTable( Uri baseAddress );
  public        UriTemplateTable(Uri        baseAddress,
IEnumerable<KeyValuePair<UriTemplate, object>> templates) { }
  public void MakeReadOnly( bool allowMultipleMatches ) { }
  public bool IsReadOnly{ get; }
  public IList<KeyValuePair<UriTemplate, object>> KeyValuePairs
    {get;}
  public Collection<UriTemplateMatchResults> Match ( Uri candidate );
  public UriTemplateMatchResults MatchSingleTemplate( Uri
    candidate );
}
```

A UriTemplateTable is, in one embodiment, at a minimum, constructed with a base address which provides the common URI prefix for all templates contained within it. An Innumerable of UriTemplate→Object bindings can also be provided. This constructor does no validation (validation is deferred until MakeReadOnly( ) is called, which can throw).

The contents of the UriTemplateTable are mutable until it is made Read-Only. This design supports the create/set/use pattern while avoiding having to take a lock inside of Match. We check IsReadOnly inside of Match and will call MakeReadOnly( ) to freeze the collection if necessary the first time Match( ) is called. MakeReadOnly( ) does validation on the overall set of candidate URI templates to ensure that no ambiguous matches may result, and that all patterns are well formed (detailed below). Validation errors are effectively design time errors; they are surfaced as InvalidOperationException.

A candidate URI may be matched against the set by calling UriTemplateTable.Match( ), which returns an instance of System.UriTemplateMatchResults if successful:

```
1)     namespace System
2)     {
3)       public class UriTemplateMatchResults
4)       {
5)         public UriTemplateMatchResults( ){ }
       //The base URI used to construct the match table
6)         public Uri BaseUri{ get; }
       //The full candidate URI (as it came in off the wire -> untouched)
7)         public Uri RequestUri{ get; }
       //the set of variable bindings that came from the query string ->
          VALUES are decoded
8)         public NameValueCollection QueryParameters { get; }
       //the set of path segments, starting after EndpointUri -> decoded
9)         public string[ ] RelativePathSegments { get; }
       //the list of variable names that were matched -> decoded
10)        public NameValueCollection BoundVariables { get; }
       //the template that was matched -> whatever you passed into the
          UriTemplate
11)        public UriTemplate MatchedTemplate { get; }
       //the unmatched part of the path
12)           //(for wildcard templates, e.g. {foo}/bar/*) -> untouched
       public string UnmatchedPath { get; }
       //the object associated with the matched template
13)        public object Data{ get; }
14)      }
15)    }
```

FIG. 5 illustrates an example template table 500. In this example, the template table 500 includes six URI templates 501A through 506A including "L1/{var1}/I1/{var2}", "L1/{var2}/I2", "L1/L4", "{var1}/I5", "{var2}/I6/*", and "*". Each of the six URI templates 501A through 506A is associated with data 501B through 506B represented as "Data1", "Data2", "Data3", "Data4", "Data5" and "Data6", respectively.

Figure 6:
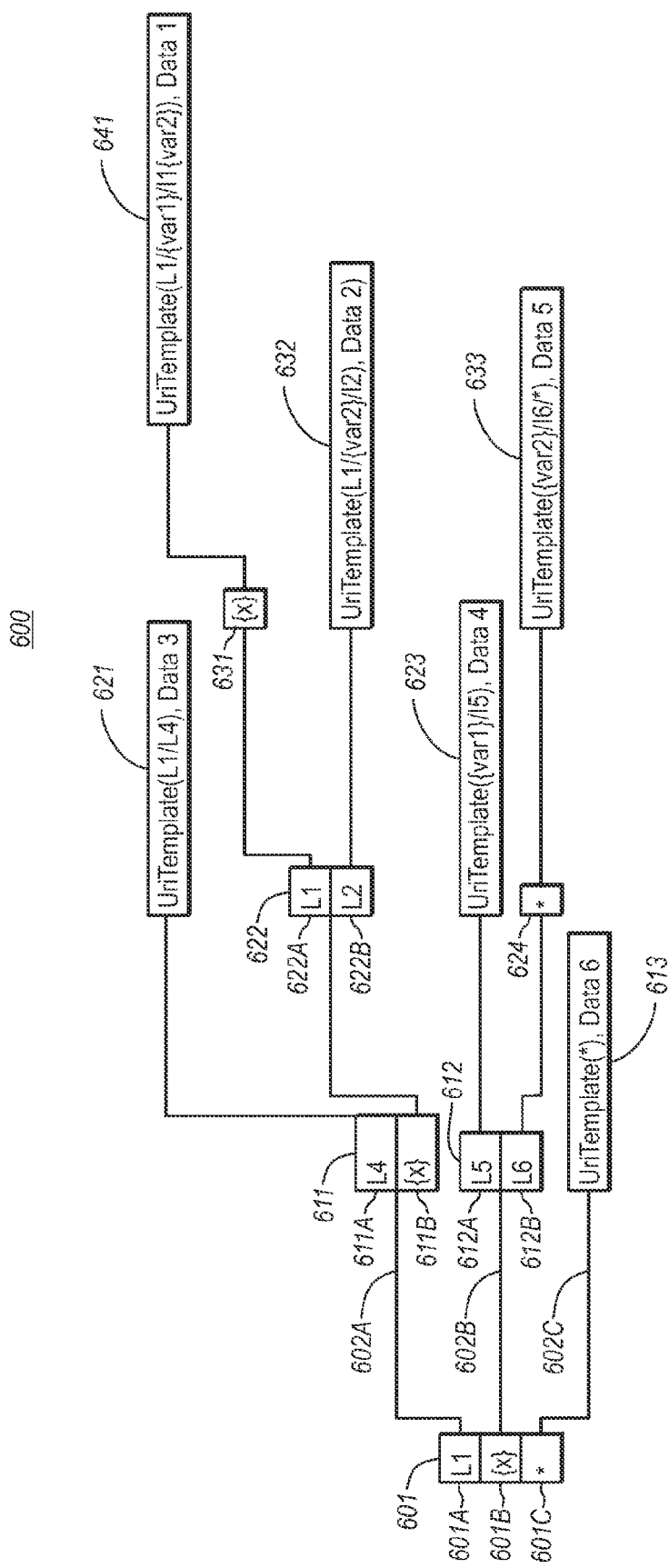
FIG. 6 illustrates a trie structure built using the template table of FIG. 5.

FIG. 6 illustrates a tree-based representation 600 of the template table 500 represented in trie format. The structure of the tree (also called a "trie") may best be understood by describing an example trie traversal of the structure 600.

Each node in the trie corresponds to an individual URI segment. Each trie node can have n literal entries (where n is any whole number zero or greater), 0 or 1 variable {var} entries, and 0 or 1 wildcard "*" entries. Leaf nodes in the trie have one name/value pair, consisting of a URI template and its associated data The parent node 601 in the trie includes a literal component L1 601A, a variable component {x} 601B, and a wildcard component "*" 601C. In determining which template table is a best match for a particular URI, the parent node 601 is first evaluated.

EXAMPLE 1

If the URI is introduced with a segment that literally includes the text "L1", then the segment 601A indicates that the top branch 602A of the trie is to be traversed to then evaluate the second-tier node 611.

The second-tier node 611 includes a literal component "L4" 611A and a variable component {x} 611B.

If the first segment included the literal component "L1" and the second segment included the literal component "L4", then the processing would proceed to leaf node 621 which indicates (in conjunction with its ancestral nodes) that the template L1/L4 in conjunction with Data3 is the best match for the input URI.

EXAMPLE 2

In a second example, assume that the URI was first introduced with segment L1 thereby proceeding processing to node 611. However, if the URI had a second segment, and that second segment was not a literal match to "L4", but was some other value, then the variable {x} would match in node 611. Accordingly, processing would proceed to third-tier node 622, which includes two literal components L1 621A and L2 621B.

If there was a third segment in the URI that matched "L1", then processing would proceed to fourth-tier node 631. If there were any fourth segment in the URI, that fourth segment would match node 631, in which case processing proceeds to the fifth-tier node 641. Being at a leaf node, the processing would return that the URI template L1/{var1}/L1/{var2} with data Data 1 as the best match.

EXAMPLE 3

In a third example, assume that the URI was first introduced with segment L1 thereby proceeding to processing to node 611, and assume that the URI includes a second segment and that that second segment does not match the literal segment "L4". In that case, processing would proceed to node 622. Now suppose that the URI included a third segment, and that the third segment was literally "L2". The matching operation would proceed to fourth-tier node 632. Since that node 632 is a leaf node, the matching operation would return that the URI template L1/{var2}/l2 in conjunction with data Data2 was the best match.

EXAMPLE 4

In the fourth example, assume that the URI includes a first segment, but that it is not the literal segment "L1". In that case, the variable segment {x} 601B matches and processing proceeds along middle branch 602B to node 612. If the URI included a second URI segment that includes the literal segment "L5", then component 612A of node 612 causes processing to proceed to node 623. There it is determined that the best match is URI template "{var1}/L5".

EXAMPLE 5

In the fifth example, assume once again that the URI includes a first segment, but that it is not the literal segment "L1". Once again, the variable segment {x} 601B matches a processing proceeds along middle branch 602B to node 612. If, however, the URI included a second URI that includes the literal segment "L6", then component 612B of node 612 causes processing to proceed to node 624. At node 624, as long as there are one or more other segments that complete the URI, wildcard node 624 is traversed to arrive at leaf node 633, where it is determined that the best URI template match is "{var2}/l6/*" in conjunction with Data 5.

EXAMPLE 6

In the sixth example, assume that processing proceeded down middle branch 602A, but somehow processing could not proceed all the way to a leaf node 633. For example, table matching for the URI "L1/L2/L3" would proceed through nodes 601 and 611 to arrive at node 622. However, there are no matches for the third segment "L3" in node 622. Accordingly, processing would backtrack up the ancestral chain until a node with a wildcard "*" is encountered. In this case, there is no node in the ancestral chain for node 622 except for the root node 601, which has wildcard segment 601C.

Another example in which backtracking up the branch 602A would be necessary is if the URI began with "L1/{x}/L1" (where {x} can be any segment), but did not include any further segments. In this case, node 631 could not be satisfied.

Backtracking might also be performed for the middle branch 602B. For example, suppose that the URI were "L2/L6", but that there were no further segments. In that case, nodes 601 and 612 could be satisfied, but node 624 would not.

In any case, if backtracking were performed, the fall-back option would be the wildcard "*" component 601C. In that case, branch 602C would be traversed to node 613, thereby resulting in a template match of "*" in conjunction with data Data6.

The following snippet of sample code illustrates some semantics and behavior of the UriTemplateTable class in accordance with one embodiment:

```
1)  public delegate void Handler( Uri u, UriTemplateMatchResults
    matchResults );
2)  IEnumerable<UriTemplate, object> dispatchTable =
    PopulateDispatchTable( );
3)  UriTemplateTable  dispatcher  =  new  UriTemplateTable(
    new  Uri(  "http://localhost:81" ), dispatchTable );
4)  UriTemplateMatchResults results = null;
5)  while( true )
6)  {
7)    Uri requestUri = GetRequest( );
8)    results = dispatcher.Match( requestUri );
9)    if( results != null)
10)   {
11)     Handler handlerDelegate = results.Data as Handler;
12)     handlerDelgate( requestUri, matchResults );
13)   }
14) }
```

The following sample unit tests illustrates the contents of UriTemplateMatchResults:

```
1)  Uri baseAddress = new Uri( "http://baseaddress/" );
2)  UriTemplate    template    =    new    UriTemplate(
    "foo/{path1}/BAR/{path2}?x={x}&y={y}" );
3)  IList<KeyValuePair<UriTemplate,    object>>
    templates    =    new
    List<KeyValuePair<UriTemplate,   object>>( )   {   new
    KeyValuePair<UriTemplate, object>>(template, "associatedData" )};
4)  UriTemplateTable table = new UriTemplateTable ( baseAddress,
    templates );
5)  UriTemplateMatchResults results = null;
6)  Uri         candidate        =        new        Uri(
    "http://baseaddress/foo/blah/bar/YADDA?y=4&x=3" );
7)  results = table.Match( candidate );
8)  Debug.Assert( results != null );
//results.BoundVariables: path1=blah, path2=YADDA, x=3, y=4
//results.QueryParameters: x=3, y=4
//results.RelativePathSegments: foo, bar, blah, yadda
//results.Template: /{path1}/BAR/{path2}?x={x}&y={y}
//results.UnmatchedPath:
//results.BaseUri: http://baseaddress/
//results.RequestUri: http://baseaddress/foo/blah/bar/YADDA?y=4&x=3
//results.Data = "associatedData"
```

Matching

An example of a URI template table will now be described by way of illustration and not limitation. A UriTemplateTable is contains perhaps multiple structurally equivalent UriTemplates. Users might pass a Boolean value to MakeReadOnly (bool allowMultipleMatches); if the user passes false to MakeReadOnly( ) and the table contains multiple structurally equivalent templates, MakeReadOnly( ) may throw. UriTemplateTable.Match returns a collection of UriTemplateResults, one result for each matching template and NULL if no match was found. UriTemplateTable.MatchSingleTemplate( ) returns a UriTemplateTableResults object if the candidate matched the URI, NULL, if no match is found, and an exception if multiple templates match.

UriTemplateTable.Match( ) is conceptually "find the best structural match for the candidate URI in the table". Best, in this case, is defined by preferring literal matches to variable matches, and using wildcard matches only as a last resort. Match( ) can return a collection; we maintain as an invariant that all of the matched templates will be UriTemplate.IsEquivalent( ) with each other.

URITEMPLATE+URITEMPLATETABLE BEHAVIORAL EXAMPLES

In one embodiment, template variable names are case-insensitive; and duplicates are not allowed within the same template string. For instance, "Testing pattern '{foo}/{FOO}?x=2'" may throw the following exception:
EXCEPTION: The UriTemplate '{foo}/{FOO}?x=2' is not valid; the variable name 'foo' appears multiple times in the template. Note that variable names are case-insensitive.

In one embodiment, the query string may be required to be a well-formed collection of name/value pairs. For instance, "Testing pattern '?x=2&X=3'" may throw the following exception:
EXCEPTION: The UriTemplate '?x=2&X=3' is not valid; the query string must have 'name=value' pairs with unique names. Note that the names are case-insensitive.

As another example, "Testing pattern '?x=2&'" may return the following exception:
EXCEPTION: The UriTemplate '?x=2&' is not valid; the query string cannot end with '&'.

As a third example, "Testing pattern '?2&X=3'" may throw the following exception:
EXCEPTION: The UriTemplate '?2&X=3' is not valid; each portion of the query string must be of the form 'name=value'.

As a fourth example, "Testing pattern '?y=2&&X=3&'" may throw the following exception:
EXCEPTION: The UriTemplate '?y=2&&X=3&' is not valid; each portion of the query string must be of the form 'name=value'.

The following are example of a successfully parsed template variable string according to one embodiment in accordance with one embodiment: foo/{path1}/BAR/{path2}?x={x}&y={y} contains variables:
path1
path2
x
y In one embodiment, the number of parameters passed to Bind* matches the names and number of template variable. For instance, if only one parameter value were provided to the BindByPosition given that URI Template, the following exception might throw:
EXCEPTION: UriTemplate 'foo/{path1}/BAR/{path2}?x={X}&y={y}' contains 4 variables but 1 values were passed to the BindByPosition method. The number of variables in the template must match the number of values passed to BindByPosition. Parameter name: values The following is another example of an exception:
EXCEPTION: UriTemplate 'foo/{path1}/BAR/{path2}?x={x}&y={y}' contains a variable named 'path1', but the NameValueCollection passed to the BindByName method does not have an entry for 'path1'.

The following is yet another example of an exception:
EXCEPTION: UriTemplate 'foo/{path1}/BAR/{path2}?x={x}&y={y}' contains a variable named 'x', but the NameValueCollection passed to the BindByName method does not have an entry for 'x'.

The following is an example of matching foo/{path1}/BAR/{path2}?x={x}&y={y} against http://baseaddr/foo//BLAH/bar/YADDA?y=3&x=4:
BoundVariables: path1=blah, path2=yadda, x=4, y=3,
QueryParameters: y=4, x=3,
RelativePathSegments: 'foo', 'blah', 'bar', 'yadda',
Template: foo/{path1}/BAR/{path2}?x={x}&y={y}
UnmatchedPath:
EndpointUri: http://baseaddr/
RequestUri: http://baseaddr/foo/BLAH/bar/YADDA/?y=4&x=3

Constructing a UriTemplateTable with an empty collection of template may result in an exception
EXCEPTION: KeyValuePairs must have at least one element.
Variables and wildcards can coexist at different segments
Making a UriTemplateTable with
1 'base/foo'
2 'base/{var}'
3 '*'
Looking up 'base/foo' yields
Data: 1
BoundVariables:
QueryParameters:
RelativePathSegments: 'base', 'foo',
Template: base/foo
UnmatchedPath:
Looking up 'base/bar' yields
Data: 2
BoundVariables: var=bar,
QueryParameters:
RelativePathSegments: 'base', 'bar',
Template: base/{var}
UnmatchedPath:
Looking up 'qux/baz' yields
Data: 3
BoundVariables:
QueryParameters:
RelativePathSegments: 'qux', 'baz',
Template: *
UnmatchedPath: qux/baz
Leading/Trailing slashes may be normalized.
If a UriTemplateTable of the following is made:
1 'base/foo'
Looking up 'base/foo' using this UriTemplateTable yields
Data: 1
BoundVariables:
QueryParameters:
RelativePathSegments: 'base', 'foo',
Template: base/foo
UnmatchedPath:
In a further example, a UriTemplateTable of the following is made:
1 '/base/foo'.
With this UriTemplateTable, looking up 'base/foo' yields
Data: 1
BoundVariables:
QueryParameters:

RelativePathSegments: 'base', 'foo',
Template: /base/foo
UnmatchedPath:
In another example, a UriTemplateTable with of the following is made:
1 'base/foo/'
Looking up 'base/foo' yields
Data: 1
BoundVariables:
QueryParameters:
RelativePathSegments: 'base', 'foo',
Template: base/foo/
UnmatchedPath:
In one embodiment, colliding literals throw an exception.
In an example of this principle, the UriTemplateTable is as follows:
1 'base/foo'
2 'base/bar'
3 'base/foo'
This example would throw an exception such as the following:
EXCEPTION: UriTemplateTable does not support both 'base/foo' and 'base/foo', as these would lead to ambiguities due to both having the same path template and neither specifying a query string.
In one embodiment, matching performed left-to-right, with no backtracking except for wildcards. The second candidate is excluded after the /foo segment is matched.
In an example of this principle, the UriTemplateTable is as follows:
1 'foo/bar'
2 '{var}/baz'
Looking up 'foo/baz' yields the following:
no match
In an example in which literals and variables match correctly at all points in the path, a UriTemplateTable is made as follows:
1 'common/foo/{var}'
2 'common/{var}/baz'
Looking up 'common/foo/baz' yields
Data: 1
BoundVariables: var=baz,
QueryParameters:
RelativePathSegments: 'common', 'foo', 'baz',
Template: common/foo/{var}
UnmatchedPath:
Wildcards can coexist at the same segment if they have different path prefixes.
In one example, the UriTemplateTable is made as follows:
1 'common/foo/{var}'
2 'common/{var}/*'
In this example, looking up 'common/foo/baz' yields
Data: 1
BoundVariables: var=baz,
QueryParameters:
RelativePathSegments: 'common', 'foo', 'baz',
Template: common/foo/{var}
UnmatchedPath:
In an negative example of this, a UriTemplateTable is made as follows:
1 'common/foo/{var}'
2 'common/{var}/*'
3 'common/foo/*'

In this case, the following exception might be thrown:
EXCEPTION: UriTemplateTable does not support both 'common/foo/{var}' and 'common/foo/*', as these would lead to ambiguities due to one having a '*' where the other has a '{variable}'.
Making a UriTemplateTable with
1 'common/foo/{var}'
2 'common/{var}/baz/*'
3 'common/foo/*'
might lead to the following exception:
EXCEPTION: UriTemplateTable does not support both 'common/foo/{var}' and 'common/foo/*', as these would lead to ambiguities due to one having a '*' where the other has a '{variable}'.
In one embodiment, variables, literals, and wildcards can coexist successfully.
For instance, suppose the following UriTemplateTable is made:
1 'common/foo/{var}'
2 '{var}/foo/*'
Looking up 'common/foo/baz/qux' yields
no match
Looking up 'yadda/foo/baz/qux' yields
Data: 2
BoundVariables: var=yadda,
QueryParameters:
RelativePathSegments: 'yadda', 'foo', 'baz', 'qux',
Template: {var}/foo/*
UnmatchedPath: baz/qux
As a second example, suppose that the following UriTemplateTable is made:
1 '{var}/foo/*'
2 'common/foo/{var}'
Looking up 'common/foo/baz/qux' yields
no match
Looking up 'yadda/foo/baz/qux' yields
Data: 1
BoundVariables: var=yadda,
QueryParameters:
RelativePathSegments: 'yadda', 'foo', 'baz', 'qux',
Template: {var}/foo/*
UnmatchedPath: baz/qux
Literals+wildcards
Suppose that the following UriTemplateTable is made:
1 'foo/baz'
2 'foo/*'
Looking up 'foo/baz/' against this UriTemplateTable yields
Data: 1
BoundVariables:
QueryParameters:
RelativePathSegments: 'foo', 'baz',
Template: foo/baz
UnmatchedPath:
Looking up 'foo/bar/' yields
Data: 2
BoundVariables:
QueryParameters:
RelativePathSegments: 'foo', 'bar',
Template: foo/*
UnmatchedPath: bar
In another example, suppose that the following UriTemplateTable is made:
1 'foo/*'
2 'foo/baz'
Looking up 'foo/baz/' yields
Data: 2

BoundVariables:
QueryParameters:
RelativePathSegments: 'foo', 'baz',
Template: foo/baz
UnmatchedPath:
Looking up 'foo/bar/' yields
Data: 1
BoundVariables:
QueryParameters:
RelativePathSegments: 'foo', 'bar',
Template: foo/*
UnmatchedPath: bar
In yet another example, suppose that the following UriTemplateTable is made:
1 'foo'
2 'foo/*'
Looking up 'foo/baz/' yields in the context of this UriTemplateTable yields
Data: 2
BoundVariables:
QueryParameters:
RelativePathSegments: 'foo', 'baz',
Template: foo/*
UnmatchedPath: baz
As another example, suppose that the following UriTemplateTable is made:
1 'foo/*'
2 'foo'
Looking up 'foo/baz/' yields in the context of this UriTemplateTable yields
Data: 1
BoundVariables:
QueryParameters:
RelativePathSegments: 'foo', 'baz',
Template: foo/*
UnmatchedPath: baz
Multiple wildcards at different segments work.
For instance, suppose the following UriTemplateTable is made:
1 '{var}/foo/baz/*'
2 '{var}/foo/*'
Looking up 'common/foo/baz/qux' yields
Data: 1
BoundVariables: var=common,
QueryParameters:
RelativePathSegments: 'common', 'foo', 'baz', 'qux',
Template: {var}/foo/baz/*
UnmatchedPath: qux
Looking up 'common/foo/xxx/qux' yields
Data: 2
BoundVariables: var=common,
QueryParameters:
RelativePathSegments: 'common', 'foo', 'xxx', 'qux',
Template: {var}/foo/*
UnmatchedPath: xxx/qux
More variables and wildcards
In another example, suppose the following UriTemplateTable is made:
1 '{var}/foo/baz'
2 '{var}/foo/*'
Looking up 'common/foo/baz' yields
Data: 1
BoundVariables: var=common,
QueryParameters:
RelativePathSegments: 'common', 'foo', 'baz',
Template: {var}/foo/baz
UnmatchedPath:
Looking up 'common/foo/qux' yields
Data: 2
BoundVariables: var=common,
QueryParameters:
RelativePathSegments: 'common', 'foo', 'qux',
Template: {var}/foo/*
UnmatchedPath: qux
Suppose that the following UriTemplateTable is made:
1 '{var}/foo/*'
2 '{var}/foo/baz'
Looking up 'common/foo/baz' yields
Data: 2
BoundVariables: var=common,
QueryParameters:
RelativePathSegments: 'common', 'foo', 'baz',
Template: {var}/foo/baz
UnmatchedPath:
Looking up 'common/foo/qux' yields
Data: 1
BoundVariables: var=common,
QueryParameters:
RelativePathSegments: 'common', 'foo', 'qux',
Template: {var}/foo/*
UnmatchedPath: qux
Case-insensitivity
Suppose that the following UriTemplateTable is made:
1 'foo/{var}'
Looking up 'FOO/BAZ' yields
Data: 1
BoundVariables: var=baz,
QueryParameters:
RelativePathSegments: 'foo', 'baz',
Template: foo/{var}
UnmatchedPath:
Empty string case
Suppose the following UriTemplateTable is made:
1 ''
Looking up ' ' yields
Data: 1
BoundVariables:
QueryParameters:
RelativePathSegments: '',
Template:
UnmatchedPath:
Simple query string behavior
Suppose the following UriTemplateTable is made:
1 ''
2 '?x=2'
3 '?x=3'
4 '?x=4&y={v}'
Looking up '' yields
Data: 1
BoundVariables:
QueryParameters:
RelativePathSegments: '',
Template:
UnmatchedPath:
Looking up '?x=2' yields
Data: 2
BoundVariables:
QueryParameters: x=2,
RelativePathSegments: '',
Template: ?x=2
UnmatchedPath:
Looking up '?x=3&y=4' yields
Data: 3

BoundVariables:
QueryParameters: x=3, y=4,
RelativePathSegments: ",
Template: ?x=3
UnmatchedPath:
Looking up '?x=4&y=4' yields
Data: 4
BoundVariables: y=4,
QueryParameters: x=4, y=4,
RelativePathSegments: ",
Template: ?x=4&y={v}
UnmatchedPath:
Looking up '?x=4' yields
Data: 1
BoundVariables:
QueryParameters: x=4,
RelativePathSegments: ",
Template:
UnmatchedPath:
Now suppose the following UriTemplateTable is made:
1 "
2 '?x=2'
Looking up '?y=3' yields
Data: 1
BoundVariables:
QueryParameters: y=3,
RelativePathSegments: ",
Template:
UnmatchedPath:
Looking up '?x=2&y=3' yields
Data: 2
BoundVariables:
QueryParameters: x=2, y=3,
RelativePathSegments: ",
Template: ?x=2
UnmatchedPath:
Query strings with just literal matches
Suppose the following UriTemplateTable is made:
1 '?f=rss&m=get'
2 '?f=rss&m=put'
3 '?f=atom&m=get'
4 '?m=put&f=atom'
Looking up "yields
no match
Looking up '?f=rss&m=get' yields
Data: 1
BoundVariables:
QueryParameters: f=rss, m=get,
RelativePathSegments: ",
Template: ?f=rss&m=get
UnmatchedPath:
Looking up '?f=atom&x=5&m=put' yields
Data: 4
BoundVariables:
QueryParameters: f=atom, x=5, m=put,
RelativePathSegments: ",
Template: ?m=put&f=atom
UnmatchedPath:
Two query strings that differ only by the set of template variables they describe cannot coexist at the same path.
For instance, suppose the following UriTemplateTable is made:
1 '?f=rss&m=get&x={var}'
2 '?f=rss&m=get&y={var}'

This definition might throw the following exception:
EXCEPTION: UriTemplateTable does not support '?f=rss&m=get&x={var}' and '?f=rss&m=get&y {var}' since they have the same path and the same common literal values for the query string.
Two query strings that differ only by the set of query string variable names they describe cannot coexist at the same path.
For example, suppose the following UriTemplateTable is made:
1 "
2 '?x=2'
3 '?y=3'
This might throw the following exception:
EXCEPTION: UriTemplateTable does not support multiple templates that have the same path as template '?y=3' but have different query strings, where the query strings cannot all be disambiguated via literal values.
Examples of valid query string matching are as follows:
Suppose that the UriTemplateTable is defined as follows:
1 'blah'
2 'foo?x=2'
3 'foo?x=3'
Looking up 'blah/' yields
Data: 1
BoundVariables:
QueryParameters:
RelativePathSegments: 'blah',
Template: blah
UnmatchedPath:
Looking up '/foo/?x=3' yields
Data: 3
BoundVariables:
QueryParameters: x=3,
RelativePathSegments: 'foo',
Template: foo?x=3
UnmatchedPath:
Suppose the following UriTemplateTable is made:
1 '?f=rss&m=get&x={var} &y={var2}'
Looking up '?M=get&x=foo&f=rss&Y=BAR' yields
Data: 1
BoundVariables: x=foo, y=BAR,
QueryParameters: m=get, x=foo, f=rss, y=BAR,
RelativePathSegments: ",
Template: ?f=rss&m=get&x={var}&y={var2}
UnmatchedPath:
Accordingly, a technology for binding and matching using URI templates is described. Furthermore, a URI template tables and their utility are introduced.

The embodiments of the present invention may comprise a special purpose or general-purpose computer including various computer hardware, as discussed in greater detail below. FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 7:
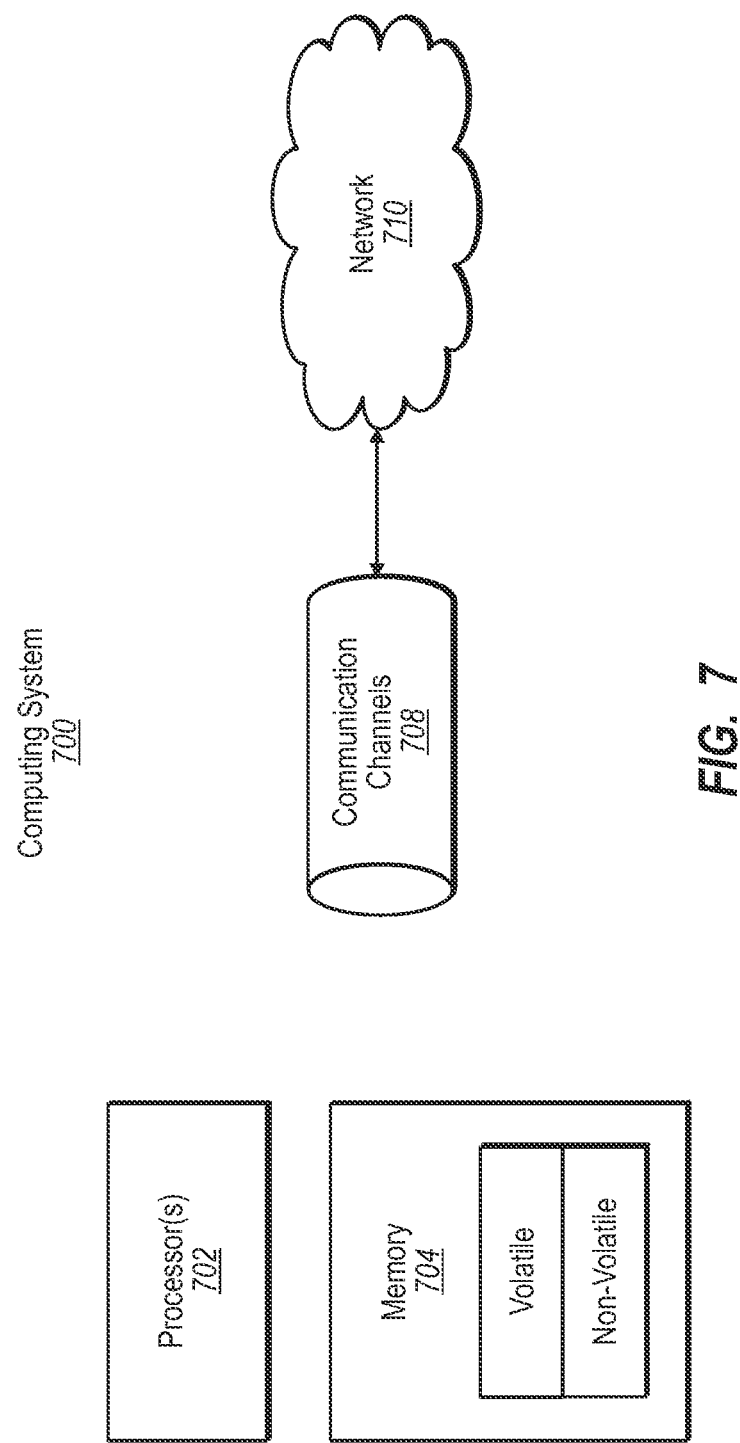
FIG. 7 illustrates a computing system in which embodiments described herein may operate.

Referring to FIG. 7, in its most basic configuration, a computing system 700 typically includes at least one processing unit 702 and memory 704. The memory 704 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 704 of the computing system 700.

Computing system 700 may also contain communication channels 708 that allow the computing system 700 to communicate with other computing systems over, for example, network 710. Communication channels 708 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer-readable storage devices having encoded thereon computer-executable instructions which, when executed by one or more processors of a computing system, cause the computing system to perform a method of producing a fully completed Uniform Resource Identifier (URI) by binding a variable segment in a URI template to particular data contained within a data value set associated with the variable segment, the method comprising:

receiving a URI template, the URI template comprising a path, the path including one or more variable segments which are to be replaced by associated data in order to create a complete and fully closed URI;

accessing a data value set, the data value set comprising data values associated with at least the one or more variable segments included in the URI template path;

identifying the one or more variable segments of the URI template included in the path;

for at least one of the one or more variable segments, identifying a data value from the data value set which is associated with the at least one variable segment; and creating a fully closed URI by replacing the at least one variable segment in the URI template with the associated data where the URI template specifies the one or more variable segments are located;

wherein the one or more variable segments includes at least a first and a second variable segment of the URI template, the method further comprising:

associating a first data component with the first variable segment;

associating a second data component with the second variable segment; and formulating the fully-qualified URI by placing the associated first data component in the URI where the URI template specifies the first variable segment is, and by placing the associated second data component in the URI where the URI template specifies the second variable segment is.

2. A computer program product comprising one or more physical computer-readable storage media having encoded thereon computer-executable instructions which, when executed by one or more processors of a computing system, cause the computing system to perform a method of matching a plurality of URI templates with a URI, the method comprising:
  accessing an input URI;
  accessing a plurality of URI templates, each URI template having a distinct set of literal segments and a distinct set of variable segments;
  comparing the input URI against each of the plurality of URI templates; and
  determining which of the plurality of URI templates is a best-match of the URI templates for the input URI.

3. A computer program product in accordance with claim 2, wherein the method further comprises:
  matching the input URI against the best-match URI template to generate resulting data extracted from the input URI, the resulting data comprising one or more values extracted from the input URI which correspond to one or more of the distinct set of variable segments of the best-match URI template.

4. A computer program product in accordance with claim 2, wherein estimating a best-match of the URI templates against the input URI comprises:
  generating a tree structure in which each node represents a URI segment, and each leaf node represents a URI template.

5. A computer program product in accordance with claim 4, wherein estimating a best-match of the URI templates against the input URI further comprises:
  performing a tree traversal of the tree structure until a leaf node is encountered.

6. A computer program product in accordance with claim 5, wherein estimating a best-match of the URI templates against the input URI further comprises:
  reporting that the URI template associated with the encountered leaf node is the best-match URI template.

7. A computer program product in accordance with claim 2, wherein at least one of the URI templates in the plurality of URI templates has a wildcard marker representing an indeterminate number of segments.

8. A computer program product in accordance with claim 2, wherein a plurality of the URI templates in the plurality of URI templates has at least one wildcard marker.

* * * * *